United States Patent [19]
Wivagg

[11] Patent Number: 5,209,895
[45] Date of Patent: May 11, 1993

[54] METHOD OF REPAIRING A NUCLEAR ASSEMBLY

[75] Inventor: Adrian P. Wivagg, Tolland, Conn.

[73] Assignee: Combustion Engineering, Inc., Windsor, Conn.

[21] Appl. No.: 530,035

[22] Filed: May 29, 1990

[51] Int. Cl.5 .............................................. G21C 19/00
[52] U.S. Cl. ..................................... 376/260; 411/54; 411/360
[58] Field of Search .................. 376/260, 463; 411/54, 411/55, 360, 361, 150, 148

[56] References Cited

U.S. PATENT DOCUMENTS

| 445,332 | 1/1891 | Phillips | 411/54 |
| 3,560,030 | 5/1967 | Macks et al. | 411/54 |
| 4,683,108 | 8/1987 | Balog | 376/260 |
| 4,772,448 | 10/1988 | Popalis et al. | 376/463 |

Primary Examiner—Donald P. Walsh
Assistant Examiner—Frederick H. Voss
Attorney, Agent, or Firm—John H. Mulholland

[57] ABSTRACT

A method of repairing a nuclear power facility metal component assembly with a "Class A" fastening between hard metal parts (12,14) includes several steps they are:

providing aligned openings (20,22) in a plurality of hard metal parts (12,14) to be assembled;

EDM machining a non-cylindrically shaped cavity (16) which is analogous to a counterbore having a cavity opening (24) smaller than the cavity base (18);

inserting a locking collar (10) with a central aperture (32) and surrounding flange (3) to receive a bolt head (42) and with weakened zones of deformation (34) through the cavity opening (24);

inserting a headed and threaded bolt (40) through the central aperture (32) of the locking collar (10) and into the aligned bores (20,22);

providing threads (46a) in another of the hard metal parts to mate the bolt threads (46);

torquing the bolt (40) in the provided mating threads (46a) to draw the bolt head (42) toward the cavity base (18) and deforming the locking collar at its weakened zones of deformation (34) to cause it to expand to an overall dimension which prevents its passage out of the cavity opening (24); and, deforming the flange (30) to interfere with rotation of the bolt by engaging depressions (50) in the bolt head (42).

7 Claims, 1 Drawing Sheet

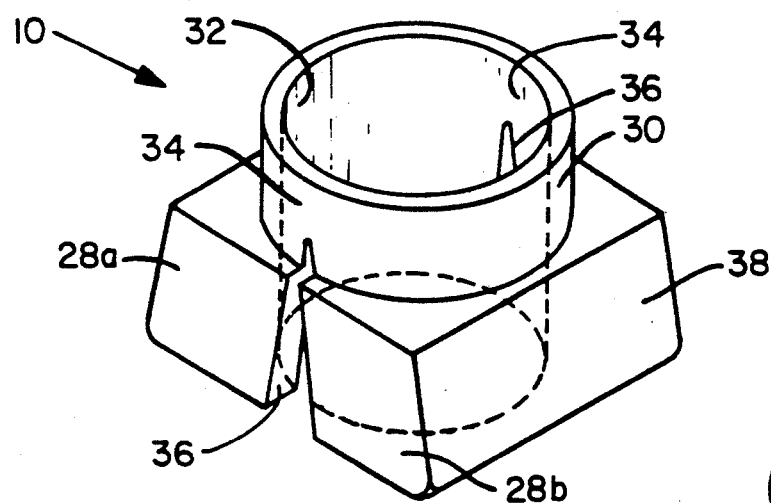
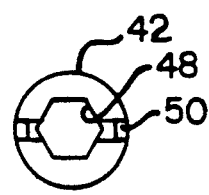
Fig. 1  Fig. 6
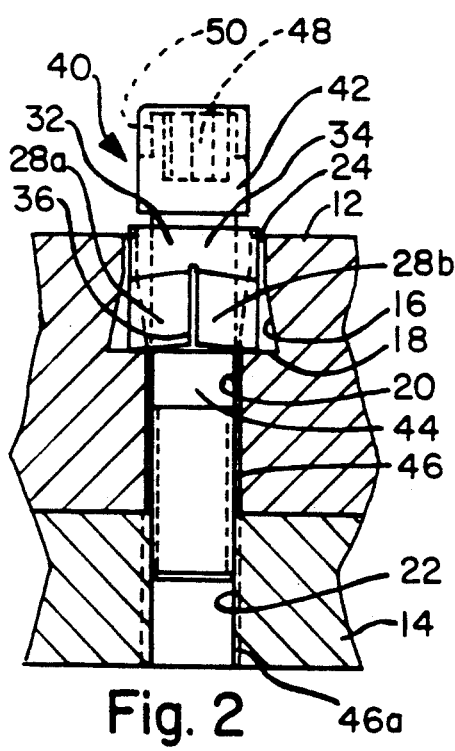
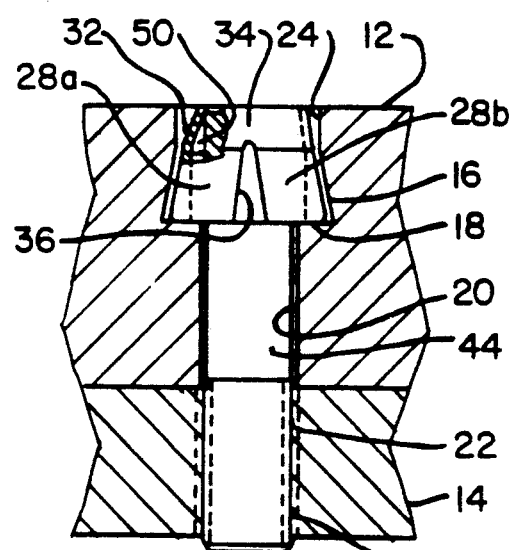
Fig. 2  Fig. 3
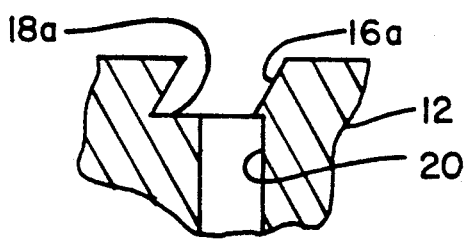
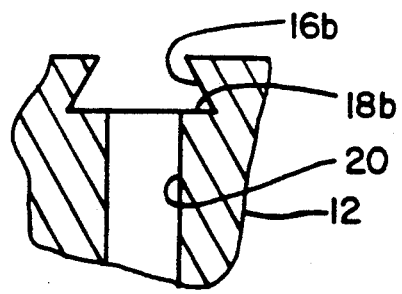
Fig. 4  Fig. 5

METHOD OF REPAIRING A NUCLEAR ASSEMBLY

FIELD OF THE INVENTION:

This invention relates to the repair of hard metal assemblies of boiling or pressurized water-cooled nuclear power facilities.

BACKGROUND OF THE INVENTION:

The repair of hard metal assemblies of boiling or pressurized water-cooled nuclear power facilities must comply with the requirements of 10 CFR 50.55a which includes by reference the American Society of Mechanical Engineers (ASME) Boiler and Pressure Vessel Code.

Nuclear reactors and other components of nuclear power facilities are made of hard metal, i.e., steel and other relatively hard alloys and therefore present fastening problems that soft materials such as wood, plastics or aluminum do not. The technicians servicing nuclear power facilities are normally operating in the "field" away from their normal machine shops and other work facilities and typically must accomplish the necessary repairs in the irradiated environment of a nuclear reactor or associated steam system. An example of such repairs would be a reactor shield support repair.

The problem of making hard metal component assemblies using fasteners which "meet code" can be better understood with reference to the above mentioned ASME code and supporting requirements such as "RDT Standard M6-2T (S-935), Mechanical Locking Devices." Clearly, fasteners used in plastics, soft metals and wood are not appropriate as hard metal fasteners. Moreover, to machine fastener insert cavities or counterbores in nuclear sub-assemblies or components in the field can be a problem, particularly if irradiated parts of a nuclear reactor are involved. This is especially true because the standards for nuclear applications under the above mentioned standards for "Mechanical Locking Devices" states "A Class A locking device is designed to capture and retain fragments in the event of failure of either the locking device or fastener". A bolt locking device for repair of hard metal assemblies of boiling or pressurized water-cooled nuclear power facilities must meet the Class A requirement because fragments otherwise can become circulating debris in the reactor coolant which can do serious damage, such as by penetration of fuel rod cladding.

SUMMARY OF THE INVENTION

The present invention is a method of repair of hard metal component assemblies of boiling or pressurized water-cooled nuclear power facilities. It involves the steps of providing aligned openings in a plurality of hard metal parts to be assembled and the fastening of the parts together.

A non-cylindrically shaped cavity, which is an enlarged opening with a flat base surrounding an exposed end of one of the aligned openings of parts to be assembled, is analogous to a counterbore. It is formed such that it includes a cavity opening smaller than the cavity base. In order to do this operation, an electron discharge machining (EDM) head with a chisel shaped tool makes two angular passes in the first workpiece or part of hard metal to be part of the assembly. Each pass extends on opposite sides of the aligned bore of the part, the first pass undercutting the opening of the cavity being formed on one side of the bore and the second pass undercutting the opening of the cavity being formed on the opposite side of the bore. This leaves the cavity opening smaller than the cavity base formed by the two passes of the EDM tool and in the shape of a square or rectangle.

Preferably, the locking collar is of stainless steel, such as Inconel 600, and has a flange and a skirt, which is slit, thereby creating weakened zones of deformation in the locking collar. The flange is generally annular and surrounds the central bolt head receiving aperture while the skirt defines a square or rectangular body made up of two wedge shaped members separated by slits such that the locking collar may expand to substantially fill the cavity upon deformation of the weakened zones formed by the slits.

The locking collar and bolt head are inserted in the cavity with a bolt shank having threads to mate with threads of another of the hard metal parts, which can be either a nut or an assembly member with an opening aligned with the opening of the first part. The bolt is torqued in the threads to draw the bolt head toward the cavity base. As the bolt advances it deforms the locking collar at its weakened zones of deformation to cause it to expand from its initial position with the skirt slits narrow to an overall dimension which prevents its passage out of the cavity opening with the skirt slits wide. The flange is crimped to cause further deformation and portions of it enter depressions provided in the bolt head to interfere with rotation of the bolt, thus locking it in place.

The resulting fastening meets Class A requirements for nuclear installations, is convenient for remote field use and permits bolt removal without damage to the bolt or the bolted parts.

BRIEF DESCRIPTION OF THE DRAWINGS

FIG. 1 is a perspective view of a locking collar of the type used in the method of the invention.

FIG. 2 is a schematic elevational view of hard metal parts to be fastened with aligned bores in which one part includes a locking collar inserted in a cavity and a bolt partially inserted and in the process of being torqued toward the cavity base.

FIG. 3 is a schematic elevational view similar to FIG. 2 with portions of the expanded locking collar and the bolt head broken away and in cross-section showing how the collar flange is crimped into a depression in the bolt head to interfere with rotation of the bolt.

FIG. 4 is a schematic view after a first cavity forming pass of a chisel shaped electron discharge machining tool.

FIG. 5 is a view similar to FIG. 4 after the second pass of the tool.

FIG. 6 is a plan view of the bolt head showing a typical form of depressions therein for purposes better shown in FIG. 3.

DETAILED DESCRIPTION OF THE PREFERRED EMBODIMENT

In the drawings, the numeral 10 generally designates a locking collar for use in the method of the invention to repair hard metal assemblies of boiling or pressurized water-cooled nuclear power facilities in compliance with the requirements of 10 CFR 50.55a.

The illustrated assembly includes a plate 12 and a member 14 to be fastened together. Plate 12 could, for example, be a nuclear reactor shield made of steel and member 14 could be a steel shield support to which it is to be fastened. In the case of a reactor repair, the plate 12 and member 14 would be irradiated and the work would be done with protective clothing and shielding or remotely operated tools.

Initially, a cavity 16 would be machined in the plate 12 utilizing a material removal method which permits "undercutting" to leave a cavity opening 24 smaller than the cavity base 18. The cavity 16 is analogous to a counterbore of aligned openings or bores 20, 22 respectively of plate 12 and member 14. It is non-cylindrically shaped, square or rectangular as shown, and defines an enlarged opening portion with the flat base 18 surrounding the outer or exposed end of opening or bore 20. The cavity 16 is preferably electron discharge machined (EDM) to provide a cavity opening 24 which is smaller than cavity base 18. Other machining methods to create the undercut may be utilized but EDM conveniently permits a two pass operation as shown in FIGS. 4 and 5.

In FIG. 4, a chisel shaped EDM tool, which may be remotely operated, has made a first pass on the left side of bore 20 at an angle. In FIG. 5 a second EDM pass has been made at the same angle in a reverse direction. In the first pass the base portion 18a is created and a temporary cavity wall 16a intersects the bore 12. When the second pass is made the remaining portion 18b is formed as well as the final wall 16b of the cavity 16. This completes the rectangular shape which accommodates locking collar 10 in expanded condition. rectangular shape which accommodates locking collar 10 in expanded condition.

FIG. 6 is a plan view of the bolt head showing a typical form of depressions therein for purposes better shown in FIG. 3.

The locking collar 10, which may be of Inconel 600, includes a body portion made up of wedges or skirt portions 28a and 28b. A flange 30 is generally annular and surrounds a central opening 32 in the locking collar 10. Weakened zones of deformation 34 are formed in the locking collar within the flange 30 and at the upper ends of v-shaped slits 36 in the skirt portion 38 of the locking collar 10.

The slits 36 are substantially closed during insertion of locking collar 10 through opening 24 and into cavity 16. The wedges or tabs 28a and 28b being in a contracted, as opposed to an expanded, position.

A bolt 40 has a head 42 and a shank 44 with threads 46. A hex key receiving head 48 or other torque tool engaging shape is included in the head. The locking collar 10 and bolt 40 are inserted either separately or in pre-assembled form into the cavity 16 with the skirt 38 facing base 18. Torquing of bolt 40 in threads 46a of bore 22, or a nut outside of bore 22, draws the bolt head 42 toward the base 18. See FIGS. 1-3 and the description thereof under the subtitle "BRIEF DESCRIPTION OF THE DRAWINGS". This deforms zones 34 and the slits 38 open so that the locking collar 10, after expansion, is prevented from passing out of the cavity 16 past smaller opening 24.

The flange 30 is deformed, preferably by crimping, to engage depressions 50 with crimped portions of the flange thereby to interfere with rotation of bolt 40. This forms a "Class A" fastening.

In the claims:

1. A method of repairing a nuclear power facility metal component assembly with a fastening between hard metal parts comprising the combination of the steps of:
   providing aligned openings in a plurality of hard metal parts to be assembled;
   creating a non-cylindrically shaped-cavity which is an enlarged opening portion with a flat base surrounding an exposed end of one of the aligned openings, said cavity being machined to provide a cavity opening smaller than the cavity base;
   inserting a locking collar with weakened zones of deformation and having a flange surrounded central aperture to receive a bolt head through the cavity opening;
   inserting a headed and threaded bolt into the central aperture of the locking collar and into the aligned opening in one of the parts;
   providing threads in another of the hard metal parts to mate the bolt threads;
   torquing the bolt in the provided mating threads to draw the bolt head toward the non-cylindrically shaped cavity base;
   deforming the locking collar at its weakened zones of deformation to cause it to expand to an overall dimension which prevents its passage out of the cavity opening; and,
   deforming the flange to interfere with rotation of the bolt.

2. The method of claim 1 in which the bolt head has depressions and the step of deforming includes a step of deforming a portion of the locking collar into the bolt head depressions.

3. The method of claim 2 in which the locking collar includes a flange and the flange is deformed into the bolt head depressions in the same deforming operation which deforms the locking collar at its weakened zones of deformation to cause it to expand.

4. The method of claim 2 in which the locking collar has a split skirt and the weakened zones of deformation are formed by slits in the locking collar and the step of deforming by crimping the flange also spreads the skirt slits open to expand the locking collar.

5. The method of claim 1 in which the steps of inserting are performed simultaneously by first placing the locking collar on the bolt and then inserting the assembled collar and bolt.

6. The method of claim 1 in which the locking collar is provided of stainless steel alloy material.

7. The method of claim 1 in which the step of creating a non-cylindrically shaped cavity is performed by electron discharge machining.

* * * * *